(12) United States Patent
Lee et al.

(10) Patent No.: US 8,416,674 B2
(45) Date of Patent: Apr. 9, 2013

(54) METHOD AND APPARATUS FOR RECEIVING MINIMUM MEAN-SQUARED-ERROR IN SINGLE-CARRIER FREQUENCY DIVISION MULTIPLE ACCESS SYSTEM

(75) Inventors: Joo-Hyun Lee, Suwon-si (KR); Sung-Kwon Jo, Suwon-si (KR); Ha-Young Yang, Yongin-si (KR); Myung-Kwang Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 12/967,417

(22) Filed: Dec. 14, 2010

(65) Prior Publication Data

US 2011/0141935 A1 Jun. 16, 2011

(30) Foreign Application Priority Data

Dec. 16, 2009 (KR) ........................ 10-2009-0125396

(51) Int. Cl.
 *H04J 9/00* (2006.01)
 *H04J 11/00* (2006.01)
(52) U.S. Cl. ........................................ 370/204; 370/210
(58) Field of Classification Search ........................ None
 See application file for complete search history.

(56) References Cited

U.S. PATENT DOCUMENTS

| 8,135,088 | B2 * | 3/2012 | Palanki et al. | 375/295 |
|---|---|---|---|---|
| 2007/0189151 | A1 * | 8/2007 | Pan et al. | 370/210 |
| 2009/0219876 | A1 * | 9/2009 | Kimura et al. | 370/329 |
| 2010/0272194 | A1 * | 10/2010 | Zhengang et al. | 375/260 |
| 2011/0019768 | A1 * | 1/2011 | Nammi et al. | 375/295 |

* cited by examiner

*Primary Examiner* — Steven H Nguyen
(74) *Attorney, Agent, or Firm* — Jefferson IP Law LLP

(57) ABSTRACT

A method and an apparatus for receiving a Minimum Mean-Squared-Error (MMSE) in a Single-Carrier Frequency Division Multiple Access (SC-FDMA) system is provided. The method includes, transforming a signal in a time domain received through an antenna into a signal in a frequency domain, and discriminating between bands respectively allocated to terminals in a frequency domain, estimating a channel and computing a weight value from the signal transformed into the frequency domain, and detecting an MMSE, computing a time-domain bias from the weight value and a channel estimation value of the signal transformed into the frequency domain, normalizing the detected MMSE by using the computed time-domain bias, and transforming the normalized signal into a normalized signal in a time domain, decoding the normalized signal transformed to the time domain, and transmitting the decoded normalized signal transformed into the time domain to each of the terminals.

12 Claims, 6 Drawing Sheets

METHOD AND APPARATUS FOR RECEIVING MINIMUM MEAN-SQUARED-ERROR IN SINGLE-CARRIER FREQUENCY DIVISION MULTIPLE ACCESS SYSTEM

PRIORITY

This application claims the benefit under 35 U.S.C. §119(a) of a Korean patent application filed in the Korean Intellectual Property Office on Dec. 16, 2009 and assigned Serial No. 10-2009-0125396, the entire disclosure of which is hereby incorporated by reference.

BACKGROUND OF THE INVENTION

1. Field of the Invention

The present invention relates to a method and an apparatus for receiving a Minimum Mean-Squared-Error (MMSE). More particularly, the present invention relates to a frequency-domain MMSE reception apparatus and a method thereof in a Single-Carrier Frequency Division Multiple Access (SC-FDMA) system, to which channel-encoding is applied.

2. Description of the Related Art

A Long Term Evolution (LTE)-advanced standard of the 3rd Generation Partnership Project (3GPP) adopts a Single-Carrier Frequency Division Multiple Access (SC-FDMA) scheme and not an Orthogonal Frequency Division Multiple Access (OFDMA) scheme as a multiple access scheme of an uplink. Among the SC-FDMA schemes, LTE adopts a Discrete Fourier Transform-Spreading (DFT-S) OFDMA scheme.

FIG. 1 a block diagram illustrating configurations of a transmitter and a Time-Domain Equalization (TDE) Minimum Mean-Squared-Error (MMSE) receiver in an SC-FDMA system according to the related art.

Referring to FIG. 1, different from an OFDMA scheme where a channel-encoded digital modulation symbol is allocated and detected in a frequency domain, in the DFT-SOFDMA scheme, a modulation symbol, which has been received by a User Equipment (UE) #1 and a UE #2, and channel-encoded in a time domain by turbo encoders 111 and 141, is transformed into a frequency-domain modulation symbol by DFT-spreading blocks 112 and 142. Then, bands are respectively allocated to terminals and the allocated bands are multiplexed by Inverse Fast Fourier Transform (IFFT) blocks 113 and 143. Thereafter, the frequency-domain modulation symbol is transmitted through the multiplexed bands.

Therefore, the reception end of the DFT-SOFDMA system performs Fast Fourier Transform (FFT) on a time-domain signal, which is received through antennas Ant #1 and Ant #N, through FFT blocks 121 and 151. Then, Inverse Discrete Fourier Transform (IDFT) blocks 122 and 152 discriminate between bands which have been allocated to the UEs in a frequency domain. Afterwards, the reception end of the DFT-SOFDMA system needs to detect a modulation symbol in a time domain through noise estimators 131 and 132, a covariance estimator 133, a Channel Impulse Response (CIR) estimator 134, a weight value computation unit 135, and a time-domain MMSE receiver 136. Thereafter, it needs to perform channel-decoding on the time-domain modulation symbol through turbo decoders 123 and 153.

At this time, time-domain MMSE receiver 136 separates a spatially-multiplexed transmission signal from a time-domain signal, to which the IDFT block coinciding with a band of each UE transforms the received signal. Thereafter, time-domain MMSE receiver 136 performs MMSE detection of a space domain, which combines signals of reception antennas, and performs MMSE Time-Domain Equalization (TDE) on a time-domain Channel Impulse Response (CIR). The dimension of a time-domain channel matrix $\hat{H}_t$ output from CIR estimator 134 increases depending on channel selectivity. Therefore, it is complex to implement time-domain MMSE receiver 136.

FIG. 2 is a block diagram illustrating a configuration of a Frequency-Domain Equalization (FDE) MMSE receiver in an SC-FDMA system according to the related art.

Referring to FIG. 2, a soft output of frequency-domain MMSE receiver 236 is the same as the soft output of time-domain MMSE receiver 136 illustrated in the SC-FDMA system of FIG. 1. The soft output is obtained through performing transformation to a time-domain by IDFT blocks 222 and 252 just after MMSE equalization and detection are performed for each subcarrier of a relevant user band in a frequency domain by frequency-domain MMSE receiver 236. Accordingly, the receiver of the DFT-SOFDMA system uses the illustrated configuration where MMSE is performed in a frequency domain and the IDFT blocks generate a time-domain soft output. In this case, apart from the IDFT blocks 222 and 252 being positioned after the MMSE (FDE), the configuration of the MMSE receiver is similar to that in FIG. 1. Therefore, a detailed description of the same configuration as in FIG. 1 will be omitted.

A modulation symbol vector $s^{(u)}$, which is channel-encoded for a user or a transmission signal u in a time domain, is defined by equation (1) below.

$$s^{(u)} = [s_0^{(u)} \ldots s_{M-1}^{(u)}]^T, u=1, 2 \qquad (1)$$

In equation (1), M represents the length of a transmission signal, and is equal to the magnitude of DFT/IDFT. In a case where U=2, U representing the number of transmission signals, and where N=2, N representing the number of reception antennas, will be described for the sake of equation development. The modulation symbol vector is transformed into a frequency-domain transmission signal vector $x^{(u)}$ through DFT, as defined by equation (2) below.

$$x^{(u)} = Fs^{(u)} \qquad (2)$$

In equation (2), F represents a DFT matrix for DFT-spreading. $[F]_{k,n}$ corresponding to an element (k,n) of the DFT matrix and $[F^{-1}]_{n,k}$ corresponding to an element (n,k) of an IDFT matrix, which is an inverse matrix of the DFT matrix, are defined by equation (3) below.

$$[F]_{k,n} = \frac{1}{\sqrt{M}} e^{-j\frac{2\pi nk}{M}},$$

$$[F^{-1}]_{n,k} = \frac{1}{\sqrt{M}} e^{j\frac{2\pi nk}{M}}, \qquad (3)$$

$$n, k = 0, 1, \ldots, M-1$$

The transmission end of the DFT-SOFDMA system allocates a signal, which has been transformed into a frequency domain as described above, to a subcarrier. Thereafter, it transforms the signal allocated to the subcarrier back into a time-domain signal through IFFT, and transmits the time-domain signal.

The reception end of the DFT-SOFDMA system performs FFT on a received signal, to which noises are added while being transmitted over a wireless channel, and transforms the received signal into a frequency-domain received signal.

Then, the reception end detects and equalizes the frequency-domain received signal for a subcarrier of an allocated band.

In order to examine a reception process in an environment of Multi-Input Multi-Output (MIMO) as well as Single-Input Single-output (SISO), a received signal vector $r_k$ is expressed for a subcarrier k by equation (4) below.

$$r_k = H_k \bar{x}_k + n_k \quad (4)$$

In equation (4), $\bar{x}_k \equiv [x_k^{(1)} \, x_k^{(2)}]^T$ represents a (U×1) transmission signal vector, which is obtained by reconstructing frequency-domain transmission signal vector $x^{(u)}$ for subcarrier k.

$$H_k = \begin{bmatrix} h_{11,k} & h_{12,k} \\ h_{21,k} & h_{22,k} \end{bmatrix} = [h_k^{(1)} \, h_k^{(2)}]$$

represents a (N×U) frequency-domain channel matrix.

$$n_k = \begin{bmatrix} n_{1,k} \\ n_{2,k} \end{bmatrix}$$

represents a (N×1) frequency-domain Additive White Gaussian Noise (AWGN) vector.

When the MMSE receiver is applied, a weight value $W_k$ of an MMSE detector, a weight value $f_k^{(u)}$ and a frequency-domain soft output $\bar{y}_k$ of the MMSE FDE are given by equations (5) to (7) below, respectively.

$$W_k = ((H_k)^H H_k + \sigma_n^2 I_U)^{-1} (H_k)^H, \quad (5)$$

$$W_k = \begin{bmatrix} w_k^{(1)} \\ w_k^{(2)} \end{bmatrix}$$

$$Q_k = \begin{bmatrix} q_k^{(1)} & 0 \\ 0 & q_k^{(2)} \end{bmatrix}, \quad (6)$$

$$q_k^{(u)} = \frac{(w_k^{(u)} h_k^{(u)})^*}{|w_k^{(u)} h_k^{(u)}|^2 + \mathrm{var}\{w_k^{(u)} h_k^{(\bar{u})} + w_k^{(u)} n\}}$$

$$\bar{y}_k = Q_k W_k r_k \quad (7)$$

When IDFT is performed on a frequency-domain soft output for each user or transmission signal, a time-domain soft output $\tilde{s}^{(u)}$ is given by equation (8) below.

$$\tilde{s}^{(u)} = F^{-1} y^{(u)} \equiv c^{(u)} s^{(u)} + e^{(u)} \quad (8)$$

In equation (8), $c^{(u)}$ represents a value corresponding to the bias of the time-domain MMSE receiver. $e^{(u)} = [e_0^{(u)} \ldots e_{M-1}^{(u)}]$ represents a time-domain error vector. A Log-Likelihood Ratio (LLR), which is necessary for channel-decoding, may be generated from a time-domain soft output in various ways. However, an LLR is typically generated by using a distance $|\tilde{s}^{(u)} - s^{(u)}|$ between the soft output and a modulation symbol according to an Euclidean algorithm.

For example, when an approximated simple LLR is used, an LLR of 16 Quadrature Amplitude Modulation (16 QAM) is defined by equations (9) and (10) below.

$$LLR_{n,0}^{(u)} = SINR^{(u)} \{\min(d_{I,+1}, d_{I,+3}) - \min(d_{I,-1}, d_{I,-3})\} \quad (9)$$
$$LLR_{n,1}^{(u)} = SINR^{(u)} \{\min(d_{Q,+1}, d_{Q,+3}) - \min(d_{Q,-1}, d_{Q,-3})\}$$
$$LLR_{n,2}^{(u)} = SINR^{(u)} \{\min(d_{I,+3}, d_{I,-3}) - \min(d_{I,+1}, d_{I,-1})\}$$
$$LLR_{n,3}^{(u)} = SINR^{(u)} \{\min(d_{Q,+3}, d_{Q,-3}) - \min(d_{Q,+1}, d_{Q,-1})\}$$

$$d_{I,+1} = \left\{\mathrm{Re}(\tilde{s}_n^{(u)}) + \frac{1}{\sqrt{10}}\right\}^2, \quad d_{Q,+1} = \left\{\mathrm{Im}(\tilde{s}_n^{(u)}) + \frac{1}{\sqrt{10}}\right\}^2 \quad (10)$$

$$d_{I,+3} = \left\{\mathrm{Re}(\tilde{s}_n^{(u)}) + \frac{3}{\sqrt{10}}\right\}^2, \quad d_{Q,+3} = \left\{\mathrm{Im}(\tilde{s}_n^{(u)}) + \frac{3}{\sqrt{10}}\right\}^2$$

$$d_{I,-1} = \left\{\mathrm{Re}(\tilde{s}_n^{(u)}) - \frac{1}{\sqrt{10}}\right\}^2, \quad d_{Q,-1} = \left\{\mathrm{Im}(\tilde{s}_n^{(u)}) - \frac{1}{\sqrt{10}}\right\}^2$$

$$d_{I,-3} = \left\{\mathrm{Re}(\tilde{s}_n^{(u)}) - \frac{3}{\sqrt{10}}\right\}^2, \quad d_{Q,-3} = \left\{\mathrm{Im}(\tilde{s}_n^{(u)}) - \frac{3}{\sqrt{10}}\right\}^2$$

Accordingly, an optimal channel-decoding performance is achieved when error vector $e^{(u)}$ is equal to the AWGN vector and $c^{(u)}=1$, so that a Minimum Error Probability (MEP) condition may be satisfied. AWGN modeling may typically be usually performed on error vector $e^{(u)}$ even when there is interference, assuming that a whitening filter is applied to error vector $e^{(u)}$. However, bias $c^{(u)}$ of an MMSE receiver is typically not equal to '1.' Therefore, bias $c^{(u)}$ satisfies an MMSE condition, but does not satisfy the MEP condition. As a result, when channel-decoding is considered, the performance of the receiver is unavoidably degraded.

It is complex to implement a time-domain MMSE receiver depending on channel selectivity in a reception end of a channel-encoded SC-FDMA system. Therefore, an SC-FDMA signal is typically received by using a frequency-domain MMSE receiver and IDFT blocks, which output the same time-domain soft output as the time-domain MMSE receiver outputs. However, the time-domain soft output, which is provided by the frequency-domain MMSE receiver and IDFT blocks, includes the bias of the time-domain MMSE. Therefore, the time-domain soft output satisfies an MMSE condition, but does not satisfy the MEP condition. In this regard, a problem arises in that the bias of the time-domain MMSE receiver degrades the performance of an overall SC-FDMA receiver, which considers channel-decoding, when the configuration of the frequency-domain MMSE receiver is used.

Hence, a receiver of a channel-encoded system needs an unbiased soft output, which satisfies not only the MMSE condition but also the MEP condition, for optimal channel-decoding.

Therefore, a need exists for a frequency-domain unbiased MMSE reception apparatus and a method thereof, which can improve channel-decoding performance in an environment of MIMO as well as SISO.

SUMMARY OF THE INVENTION

An aspect of the present invention is the address the above-mentioned problems and/or disadvantages and to provide at least the advantages described below. Accordingly, an aspect of the present invention is to provide a frequency-domain unbiased Minimum Mean-Squared-Error (MMSE) reception apparatus and a method thereof, which can improve channel-decoding performance in a Multi-Input Multi-Output (MIMO) environment as well as Single-Input Single-output (SISO) environment.

In accordance with an aspect of the present invention, a method for receiving an MMSE in a Single-Carrier Frequency Division Multiple Access (SC-FDMA) system is provided. The method includes, transforming a signal in a time domain received through an antenna into a signal in a frequency domain, and discriminating between bands respectively allocated to terminals in a frequency domain, estimating a channel and computing a weight value from the signal transformed to the frequency domain, and detecting an MMSE, computing a time-domain bias from the weight value and a channel estimation value of the signal transformed into the frequency domain, normalizing the detected MMSE by using the computed time-domain bias, and transforming the normalized signal into a normalized signal in a time domain, decoding the normalized signal transformed into the time domain, and transmitting the decoded normalized signal transformed into the time domain to each of the terminals.

In accordance with another aspect of the present invention, a method for receiving an MMSE in an SC-FDMA system is provided. The method includes, transforming a signal in a time domain received through an antenna into a signal in a frequency domain, and discriminating between bands respectively allocated to terminals in a frequency domain, estimating a channel and computing a weight value from the signal transformed into the frequency domain, detecting an MMSE, and transforming the detected MMSE into an MMSE signal in a time domain, computing a time-domain bias from the weight value and a channel estimation value of the signal transformed to the frequency domain, normalizing the detected MMSE by using the computed time-domain bias, and decoding the normalized signal, and transmitting the decoded normalized signal into each of the terminals.

Further, in accordance with another aspect of the present invention, an apparatus for receiving an MMSE in an SC-FDMA system is provided. The apparatus includes, a first transformation unit for transforming a signal in a time domain received through an antenna into a signal in a frequency domain, and discriminating between bands respectively allocated to terminals in a frequency domain, a channel estimator for estimating a channel from the signal transformed into the frequency domain, a weight value computation unit for computing a weight value from the channel estimation value, an MMSE detector for detecting an MMSE from the signal transformed into the frequency domain by using the computed weight value, a second transformation unit for transforming the detected MMSE value into an MMSE signal in a time domain, a bias computation unit for computing a time-domain bias from the weight value and the channel estimation value of the signal transformed into the frequency domain, a normalizer for normalizing the MMSE signal transformed into the time domain by using the computed time-domain bias, and a decoder for decoding the normalized MMSE signal transformed into the time domain, and transmitting the decoded normalized MMSE signal to each of the terminals.

Further, in accordance with another aspect of the present invention, an apparatus for receiving an MMSE in an SC-FDMA system is provided. The apparatus includes, a first transformation unit for transforming a signal in a time domain received through an antenna into a signal in a frequency domain, and discriminating between bands respectively allocated to terminals in a frequency domain, a channel estimator for estimating a channel from the signal transformed into the frequency domain, a weight value computation unit for computing a weight value from the channel estimation value, an MMSE detector for detecting an MMSE from the signal transformed into the frequency domain by using the computed weight value, a bias computation unit for computing a time-domain bias from the weight value and the channel estimation value, a normalizer for normalizing the detected MMSE by using the computed time-domain bias; a second transformation unit for transforming the normalized signal into a normalized signal in a time domain, and a decoder for decoding the normalized signal transformed into the time domain, and transmitting the decoded normalized signal to each of the terminals.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
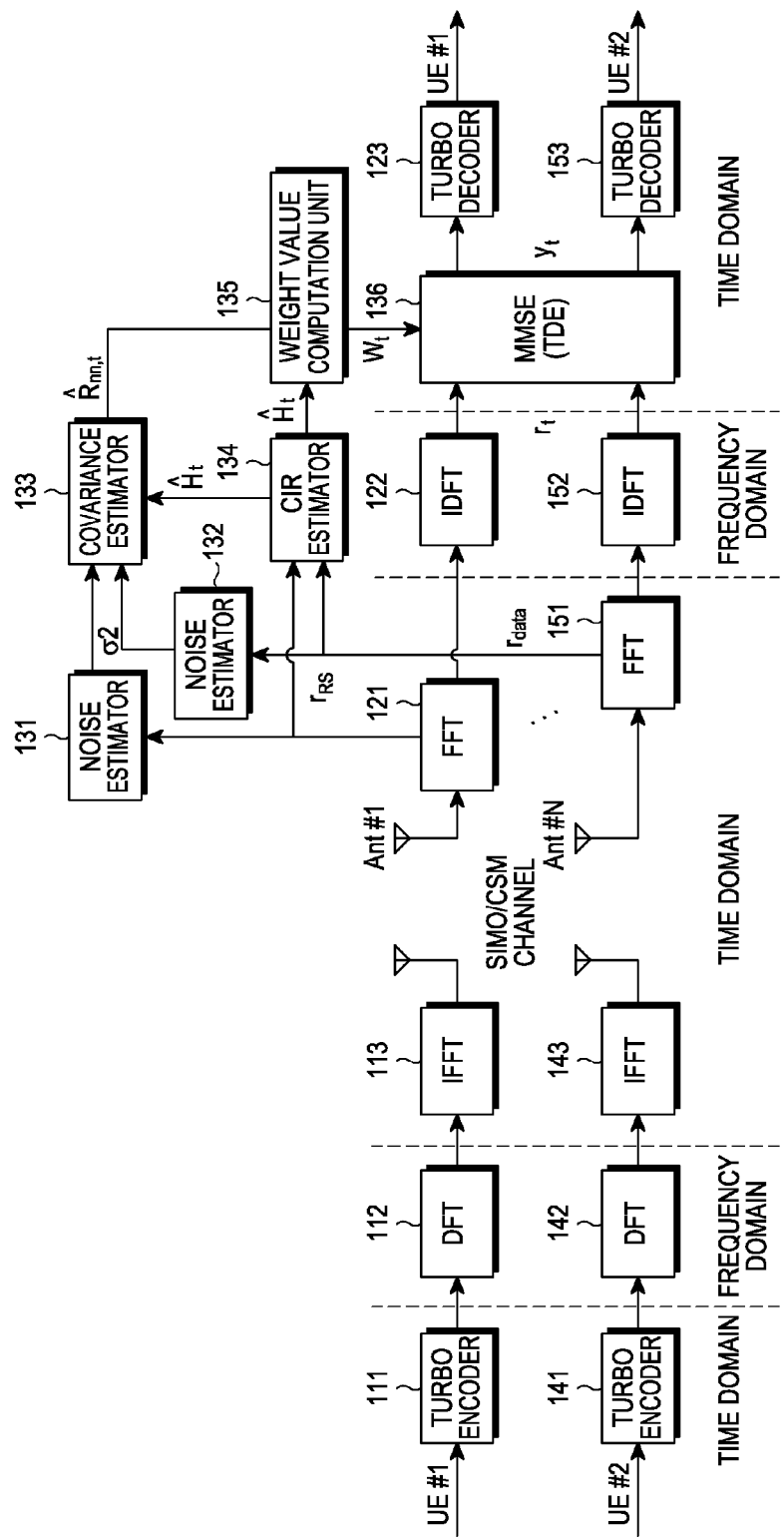
FIG. 1 is a block diagram illustrating configurations of a transmitter and a Time-Domain Equalization (TDE) Minimum Mean-Squared-Error (MMSE) receiver in a Single-Carrier Frequency Division Multiple Access (SC-FDMA) system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness. Also, terms described below, which are defined considering functions in the present invention, can be different depending on user and operator's intention or practice, etc. Therefore, the terms should be defined based on the disclosure throughout this specification.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 3 through 6D, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Exemplary embodiments of the present invention include a frequency-domain unbiased Minimum Mean-Squared-Error (MMSE) reception apparatus and a method thereof, which can eliminate a bias $c^{(u)}$ of a time-domain MMSE receiver, which is included in a time-domain soft output, from the time-domain soft output in consideration of channel-decoding when an MMSE receiver is applied in a channel-encoded Single-Carrier Frequency Division Multiple Access (SC-FDMA) system. An unbiased MMSE receiver transforms the bias of the time-domain MMSE receiver, which is included in the time-domain soft output, into an equivalent bias in a frequency-domain. Then, the bias of the time-domain MMSE receiver, which has been transformed into the frequency domain, can be used for the compensation in the frequency domain. In this regard, the unbiased MMSE receiver is easily implemented when compared with a time-domain unbiased MMSE receiver. In addition, the unbiased MMSE receiver generates a time-domain soft output which satisfies both an MMSE condition and a Minimum Error Probability (MEP) condition even when bias $c^{(u)}$ is not equal to '1.' By doing this, it is intended to improve the performance of the 2-dimensional MMSE receiver.

Exemplary embodiments of the present invention propose the configuration of a receiver when a frequency-domain MMSE receiver is applied to a Single-Input Single-output (SISO) or a Multi-Input Multi-Output (MIMO) receiver in the channel-encoded SC-FDMA system.

When a space-domain MMSE detector is applied in the MMSE receiver, an MMSE weight value of each subcarrier satisfies equation (11) below.

$$(w_k^{(u)}h_k^{(u)})^* = w_k^{(u)}h_k^{(u)} = w_k^{(u)}RR^{-1}h_k^{(u)} = w_k^{(u)}R(w_k^{(u)})^H, R = (H_k)^H H_k + \sigma_n^2 I_U \quad (11)$$

From equation (11), a weight value $q_k^{(u)}$ of an MMSE Frequency-Domain Equalization (FDE) as expressed in equation (6), becomes '1' according to equation (12) below.

$$q_k^{(u)} = \frac{(w_k^{(u)}h_k^{(u)})^*}{|w_k^{(u)}h_k^{(u)}|^2 + \text{var}\{w_k^{(u)}h_k^{(u)} + w_k^{(u)}n\}} \quad (12)$$

$$= \frac{w_k^{(u)}h_k^{(u)}}{w_k^{(u)}R(w_k^{(u)})^H} \equiv 1$$

Therefore, the frequency-domain MMSE receiver only applies an MMSE weight value for the space-domain. It uses a normalization block for eliminating the bias of the time-domain MMSE receiver in place of the MMSE FDE.

An Additive White Gaussian Noise (AWGN) modeling can be performed on error vector $e^{(u)}$ in time-domain soft output $\tilde{s}^{(u)}$, as expressed in equation (8), even when there is interference, assuming that a whitening filter is applied to error vector $e^{(u)}$. Therefore, $E\{e^{(u)}\}=0$, and $\text{Var}\{e^{(u)}\}=\sigma_{e^{(u)}}^2=E\{|e^{(u)}|^2\}$. In addition, when a gain of an IDFT (Inverse Discrete Fourier Transform) at an reception end of the SC-FDMA system is assumed to be equal to '1,' a soft output of the frequency-domain MMSE receiver is equal to a soft output of the time domain MMSE receiver. Accordingly, $E\{|s^{(u)}-\tilde{s}^{(u)}|^2\}$ of a time-domain MSE is also equal to $E\{|x^{(u)}-y^{(u)}|^2\}$ of a frequency-domain MSE. As a result, a variance $\sigma_{e^{(u)}}^2$ of error vector $e^{(u)}$ can be expressed by equation (13) below.

$$\sigma_{e^{(u)}}^2 = E\{|s^{(u)}-\tilde{s}^{(u)}|^2\} = E\{|x^{(u)}-y^{(u)}|^2\} \quad (13)$$

Meanwhile, the square of a difference between a transmission signal vector x and a soft output vector y of the MMSE FDE is developed in the frequency domain as in equation (14) below.

$$|x-y|^2 = |x-Wr|^2 \quad (14)$$

$$= |x-(H^H H + \sigma_n^2 I_U)^{-1} H^H (Hx+n)|^2$$

$$= \left| \begin{array}{c} x-(H^H H + \sigma_n^2 I_U)^{-1} H^H Hx + \\ (H^H H + \sigma_n^2 I_U)^{-1} \sigma_n^2 I_U x - \\ (H^H H + \sigma_n^2 I_U)^{-1} \sigma_n^2 I_U x - \\ (H^H H + \sigma_n^2 I_U)^{-1} H^H n \end{array} \right|^2$$

$$= |(H^H H + \sigma_n^2 I_U)^{-1} (\sigma_n^2 x - H^H n)|^2$$

In equation (14), A is defined as $(H^H H + \sigma_n^2 I_U)^{-1}$. When the definition of A, and equations $E\{xx^H\}=I_U$, $E\{xn^H\}=E\{nx^H\}$ and $E\{nn^H\}=\sigma_n^2 I_U$ are used, a frequency-domain MSE can be expressed by equation (15) below.

$$E\{|x-y|^2\} = E\{|A(\sigma_n^2 x - H^H n)|^2\} \quad (15)$$

$$= E\{A(\sigma_n^2 x - H^H n)(\sigma_n^2 x^H - n^H H)A^H\}$$

$$= E\left\{ A \left( \begin{array}{c} \sigma_n^4 xx^H - \sigma_n^2 xn^H H - \\ H^H n\sigma_n^2 x^H + H^H nn^H H \end{array} \right) A^H \right\}$$

$$= A \left( \begin{array}{c} \sigma_n^4 E\{xx^H\} - \sigma_n^2 E\{xn^H\}H - \\ \sigma_n^2 H^H E\{nx^H\} + H^H E\{nn^H\}H \end{array} \right) A^H$$

$$= A\sigma_n^2 (A^H)^{-1} A^H$$

$$= A\sigma_n^2$$

In addition, when it is assumed that noise variances at a reception antenna are all the same (i.e., $\sigma_{n,r}^2 \equiv \sigma_n^2$), a weight value of the MMSE detector satisfies an equation $W = H^H \{HH^H + \sigma_n^2 I_N\}^{-1} = \{H^H H + \sigma_n^2 I_U\}^{-1} H^H$. Therefore, a frequency-domain MSE can be changed in form as in equation (16) below.

$$E\{|x-y|^2\} = E\{|x - W(Hx+n)|^2\} \quad (16)$$

$$= E\{(x - WHx - Wn)(x^H - x^H H^H W^H - n^H W^H)\}$$

$$= E\begin{Bmatrix} xx^H - xx^H H^H W^H - xn^H W^H - \\ WHxx^H + WHxx^H H^H W^H + WHxn^H W^H - \\ Wnx^H + Wnx^H H^H W^H + Wnn^H W^H \end{Bmatrix}$$

$$= E\{xx^H\} - E\{xx^H\}H^H W^H - WHE\{xx^H\}$$
$$+ WHE\{xx^H\}H^H W^H + WE\{nn^H\}W^H$$

$$= I_U - H^H W^H - WH + W(HH^H + \sigma_n^2 I_N)W^H$$

$$= I_U - H^H W^H - WH + W(HH^H + \sigma_n^2 I_N)(H^H)^{-1} H^H W^H$$

$$= I_U - H^H W^H - WH + WW^{-1} H^H W^H$$

$$= I_U - WH$$

Therefore, from equations (15) and (16), variance $\sigma_{e(u)}^2$ of error vector $e^{(u)}$ of the time-domain MMSE receiver for a user or a transmission signal u can be computed by using a weight value $w^{(u)}$ of the frequency-domain MMSE receiver as in equation (17) below.

$$\sigma_{e(u)}^2 = \sigma_n^2 [A]_{uu} \quad (17)$$
$$= 1 - E|w^{(u)} h^{(u)}|,$$

$$h_k^{(u)} = \begin{bmatrix} h_{1u,k} \\ h_{2u,k} \end{bmatrix}$$

It can be assumed that the power of a transmitted modulation symbol is usually normalized (i.e., $\sigma_s^2 = 1$). Therefore, bias $c^{(u)}$ of the time-domain MMSE receiver is defined by equation (18) below.

$$c^{(u)} = 1 - \sigma_{e(u)}^2 = E|w^{(u)} h^{(u)}| \quad (18)$$

Accordingly, when the frequency-domain MMSE receiver is used in the SC-FDMA system, there is a need of normalization using an equation $$\frac{1}{c^{(u)}} = \frac{1}{E|w^{(u)} h^{(u)}|}$$

so that an unbiased soft output may be obtained in the time-domain.

A normalized frequency-domain soft output $\bar{y}'_k$ and a time-domain soft output $\tilde{s}'^{(u)}$, which is obtained after performing IDFT on normalized frequency-domain soft output $\bar{y}'_k$, of an unbiased MMSE receiver are expressed by equation (19) below.

$$\bar{y}'_k = \text{diag}\left\{\frac{1}{c^{(1)}}, \frac{1}{c^{(2)}}\right\} W_k r_k, \quad (19)$$

$$\tilde{s}'^{(u)} = F^{-1} y'^{(u)} = s^{(u)} + e'^{(u)},$$

and $$e'^{(u)} = \frac{e^{(u)}}{c^{(u)}}$$

Figure 3:
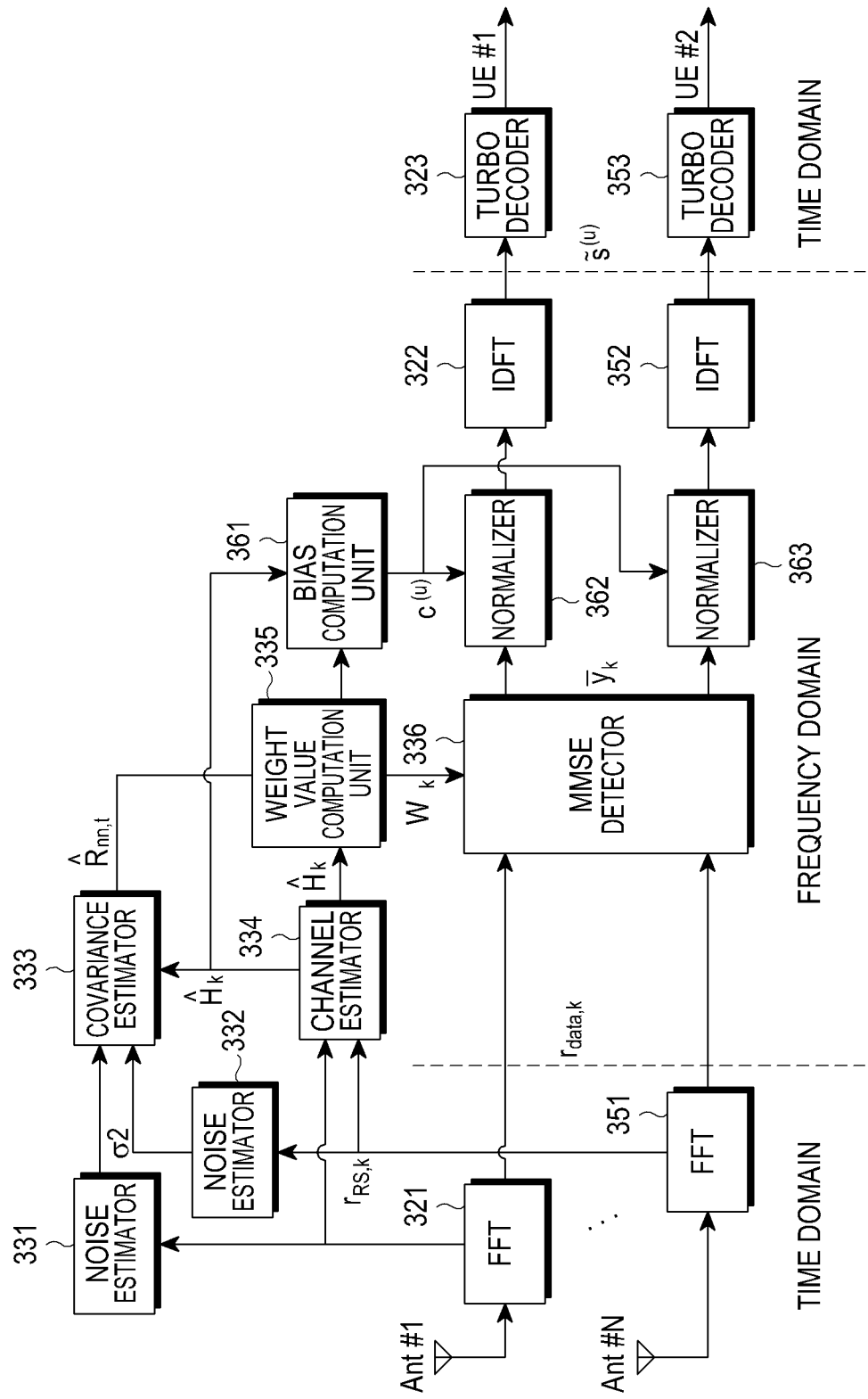
FIG. 3 is a block diagram illustrating a configuration of an unbiased MMSE receiver in a channel-encoded SC-FDMA system according to an exemplary embodiment of the present invention.

FIG. 3 is a block diagram illustrating a configuration of an unbiased MMSE receiver according to an exemplary embodiment of the present invention.

Referring to FIG. 3, an unbiased MMSE receiver includes normalizers 362 and 363, which are located between an MMSE detector 336 and IDFT blocks 322 and 352. In addition, the unbiased MMSE receiver includes a bias computation unit 361, which computes a bias for an output of a weight value computation unit 335 and provides the computed bias to normalizers 362 and 363.

Figure 2:
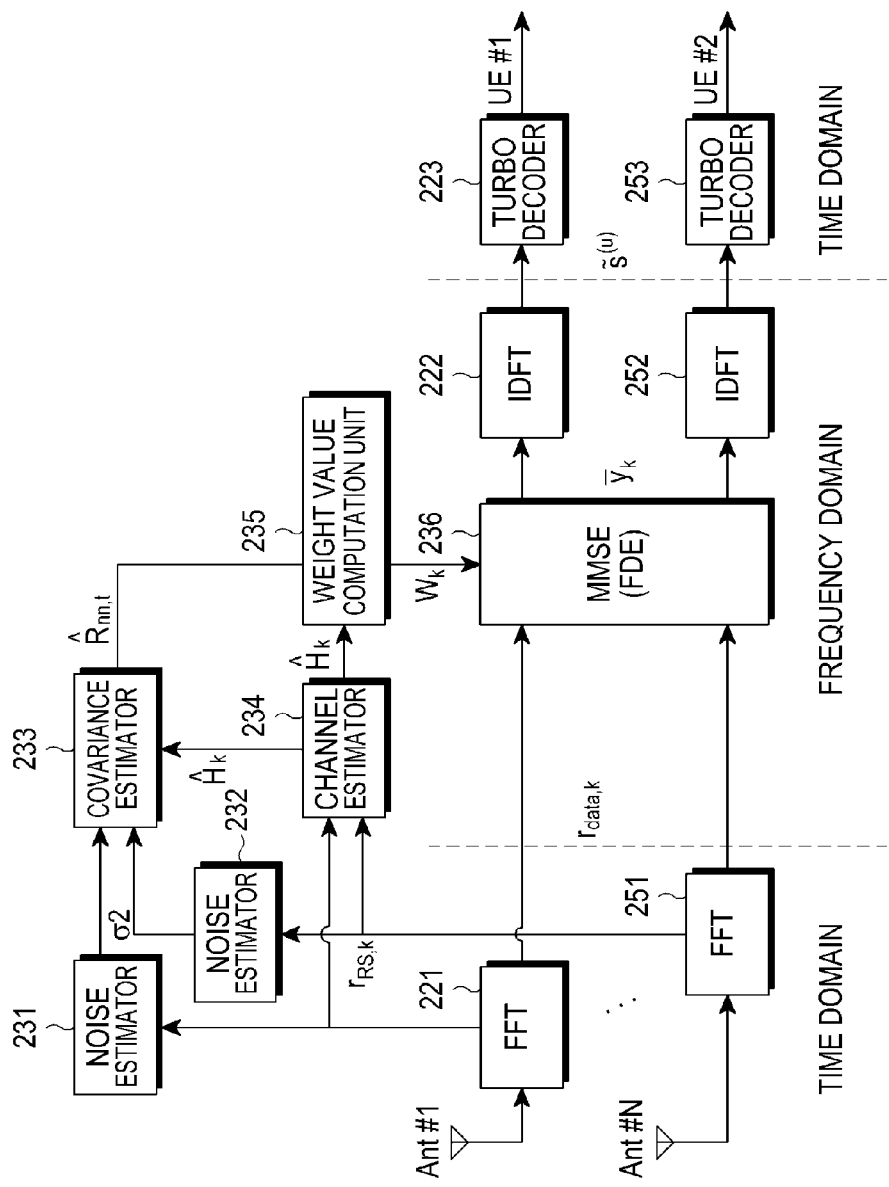
FIG. 2 is a block diagram illustrating a configuration of a Frequency-Domain Equalization (FDE) MMSE receiver in an SC-FDMA system according to the related art.

Namely, the unbiased MMSE receiver computes an MMSE weight value vector in a frequency domain through weight value computation unit 335. Then, the unbiased MMSE receiver computes a bias from the frequency-domain MMSE weight value vector through bias computation unit 361. Thereafter, the unbiased MMSE receiver performs IDFT on an unbiased soft output, which has gone through MMSE detector 336 and normalizers 362 and 363, through IDFT blocks 322 and 352, and transforms the unbiased soft output into a time-domain unbiased soft output. In this case, apart from normalizers 362 and 363 being positioned between the MMSE detector 336 and the IDFT blocks 322 and 352, the configuration of the MMSE receiver is similar to that in FIG. 2. Therefore, a detailed description of the same configuration as in FIG. 1 will be omitted.

On the other hand, time-domain bias $c^{(u)}$ is not a function of a subcarrier index or a sample index. Therefore, normalizers may be located after IDFT blocks.

Figure 4:
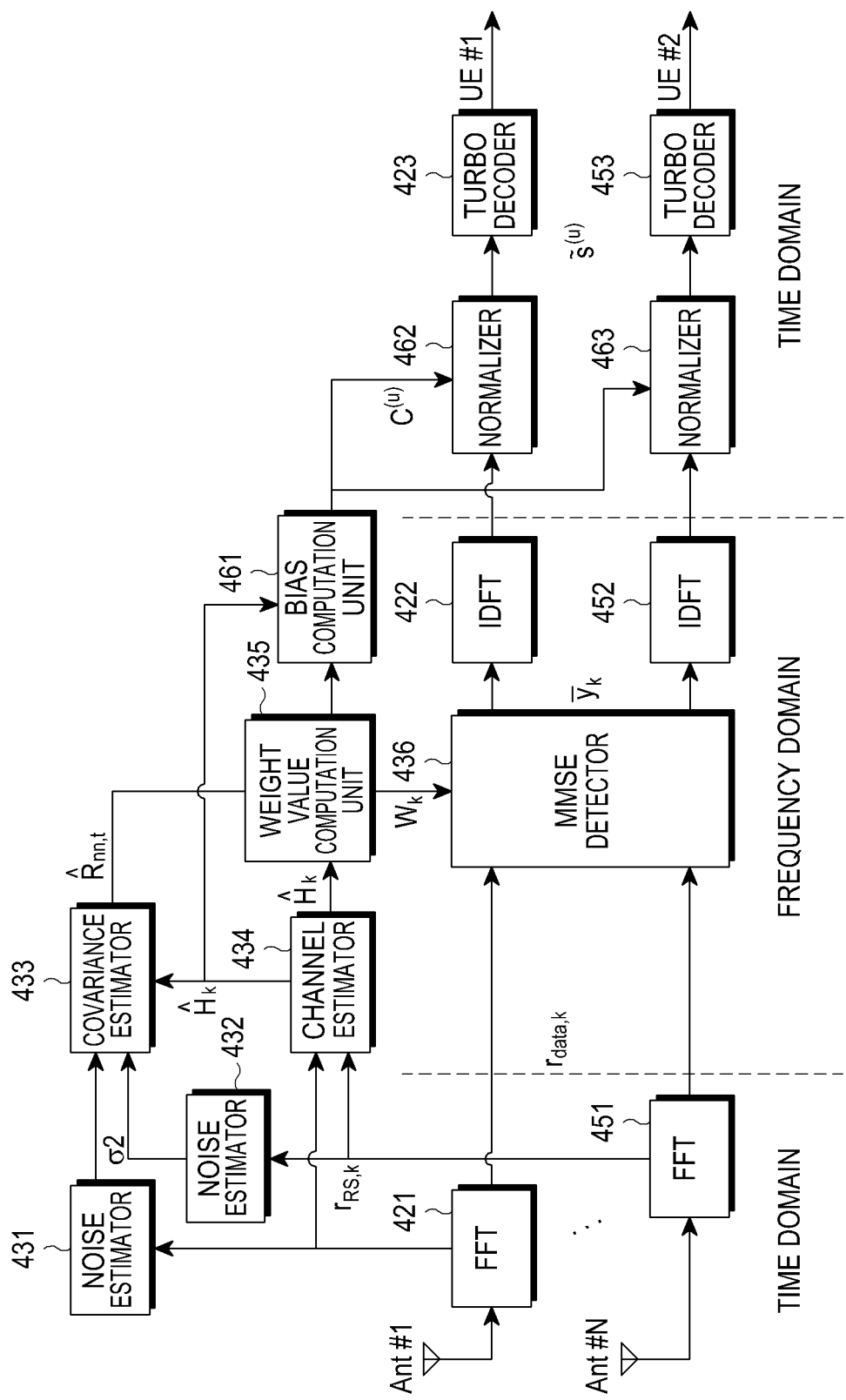
FIG. 4 is a block diagram illustrating a configuration of an unbiased MMSE receiver in a channel-encoded SC-FDMA system according to an exemplary embodiment of the present invention.

FIG. 4 is a block diagram illustrating a configuration of an unbiased MMSE receiver according to an exemplary embodiment of the present invention.

Referring to FIG. 4, an unbiased soft output, which has gone through IDFT blocks 422 and 452 and normalizers 462 and 463, is illustrated. The unbiased soft output can be expressed by equation (20) below. In this case, apart from the normalizers 462 and 463 being positioned after the IDFT blocks 422 and 452, the configuration of the unbiased MMSE receiver is the same as that in FIG. 3. Therefore, its detailed description will be omitted.

$$\tilde{s}'^{(u)} = \frac{F^{-1} y^{(u)}}{c^{(u)}} = s^{(u)} + e'^{(u)}, \quad (20)$$

$$e'^{(u)} = \frac{e^{(u)}}{c^{(u)}}$$

Figure 5:
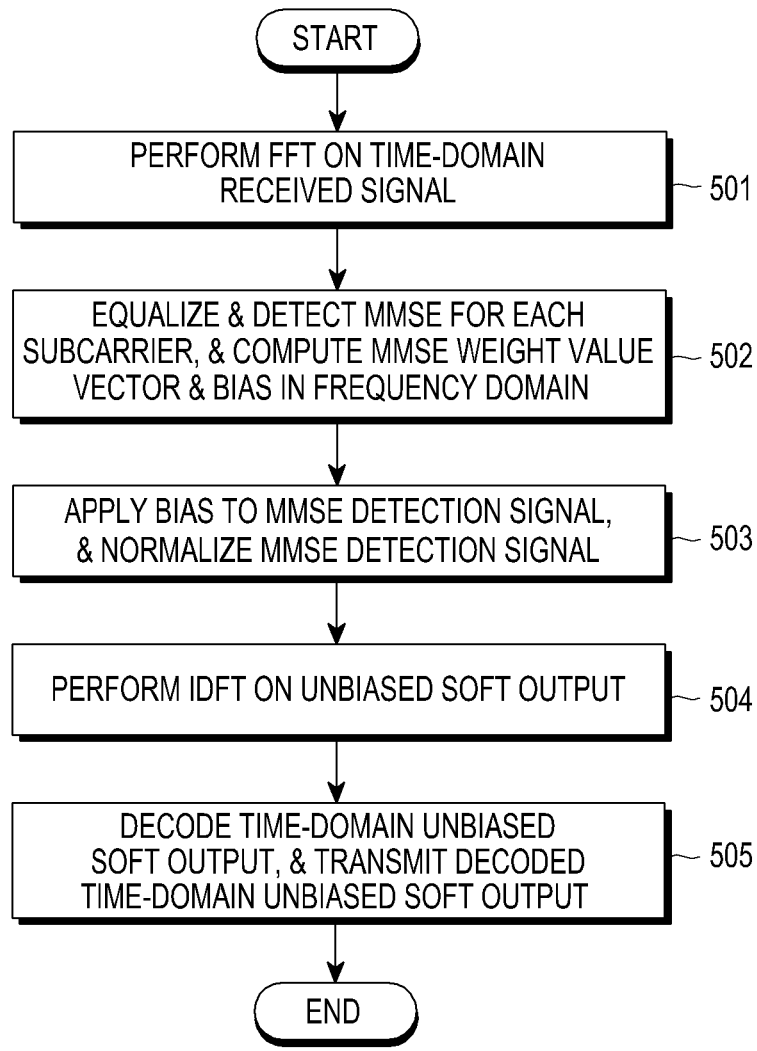
FIG. 5 is a flowchart illustrating an operation sequence of an unbiased MMSE receiver in a channel-encoded SC-FDMA system according to an exemplary embodiment of the present invention.

FIG. 5 is a flowchart illustrating an operation sequence of an unbiased MMSE receiver in a channel-encoded SC-FDMA system according to an exemplary embodiment of the present.

Referring to FIG. 5, in step 501, FFT is performed on a time-domain received signal and the time-domain received signal is transformed into a frequency-domain received signal. In step 502, MMSE equalization and detection are performed for each subcarrier of a user band in a frequency domain. In addition, an MMSE weight value vector and a bias are computed for the frequency-domain received signal in the frequency domain. In step 503, the computed bias is applied to the MMSE detection signal and the MMSE detection signal is normalized. In step 504, IDFT is performed on an unbiased soft output and the unbiased soft output is transformed into a time-domain unbiased soft output. In step 505, the time-domain unbiased soft output is decoded and then the decoded time-domain unbiased soft output is transmitted to each terminal.

The operation sequence of the unbiased MMSE receiver according to an exemplary embodiment of the present invention as illustrated in FIG. 4 are the same as that of FIG. 5 except that steps 503 and 504 are reversed in their sequence in FIG. 5. Therefore, an overlapping description thereof will be omitted.

FIGS. 6A through 6D are perspective views illustrating performances of an unbiased MMSE receiver according to an exemplary embodiment of the present invention.

Referring to FIGS. 6A through 6D, performance comparison results of an unbiased MMSE receiver is illustrated. When N=2, N representing the number of reception antennas, and when U=2, U representing the number of transmission signals, where the number of users in a Discrete Fourier Transform-Spreading Orthogonal Frequency Division Multiple Access (DFT-SOFDMA) system have 5 MHz bandwidth according to the Long Term Evolution (LTE) standard.

Figure 6A:
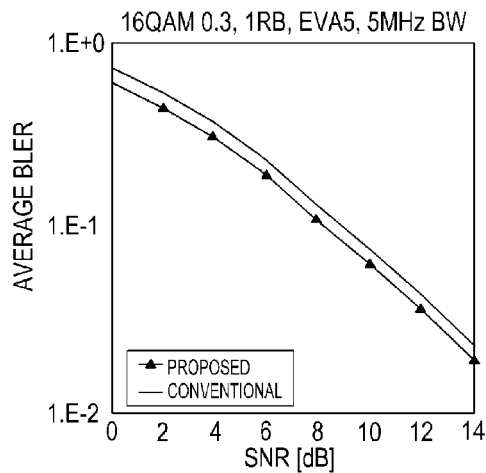
FIGS. 6A through 6D are perspective views illustrating performances of an unbiased MMSE receiver according to an exemplary embodiment of the present invention.
Figure 6B:
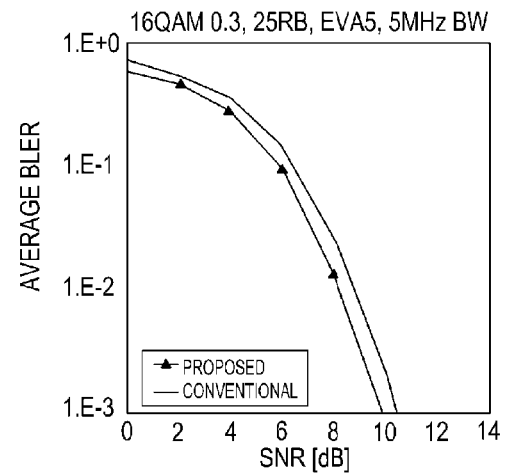
Figure 6C:
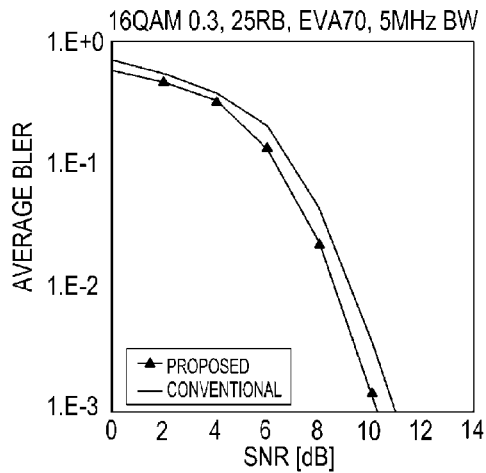
Figure 6D:
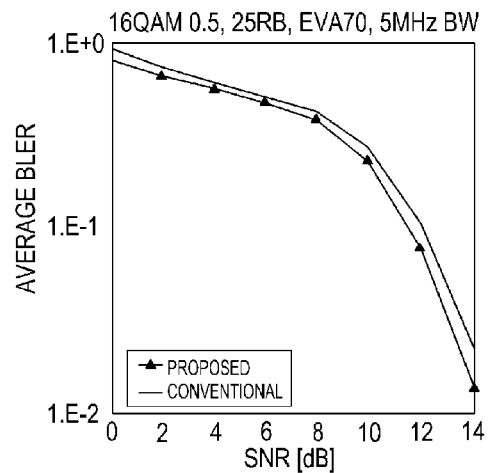

In FIGS. 6A and 6B, a maximum Doppler frequency is 5 Hz over an Extended Vehicular A (EVA) channel. In FIGS. 6C and 6D, a maximum Doppler frequency is 70 Hz over the EVA channel. In FIG. 6A, the number of Resource Blocks (RBs), which are allocated frequencies, is '1' over the EVA channel. In FIGS. 6B to 6D, the number of RBs, which are allocated frequencies, is '25' over the EVA channel. In FIGS. 6A to 6C, an encoding rate is 0.3 in the 16 Quadrature Amplitude Modulation (16 QAM) modulation scheme over the EVA channel. In FIG. 6D, an encoding rate is 0.5 in the 16 QAM modulation scheme over the EVA channel. The results of the performance comparison show that the unbiased MMSE receiver can secure a performance gain of about 0.4 to 0.9 dB with 10% BLock Error Rate (BLER) as a reference with a complexity which is lower than the MMSE receiver.

According to an exemplary embodiment of the present invention described above, an unbiased MMSE reception method and apparatus for eliminating a bias $c^{(u)}$ of a time-domain MMSE receiver, which is included in a time-domain soft output, are used when a frequency-domain MMSE receiver is applied in a channel-encoded SC-FDMA system. Thereby, the bias of the time-domain MMSE receiver, which is included in the time-domain soft output, is transformed into an equivalent bias in a frequency-domain. Thereafter, the bias of the time-domain MMSE receiver, which has been transformed into the frequency domain, can be used for the compensation in the frequency or time domain. Accordingly, there is an advantage in that the frequency-domain MMSE receiver can obtain a desired performance gain with a lower complexity than a time-domain unbiased MMSE receiver. Moreover, it is possible to generate a time-domain soft output which satisfies both an MMSE condition and an MEP condition. Hence, it is possible to improve the performance of an SC-FDMA receiver, which considers channel-decoding.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for receiving a Minimum Mean-Squared-Error (MMSE) in a Single-Carrier Frequency Division Multiple Access (SC-FDMA) system, the method comprising:

transforming a signal in a time domain received through an antenna into a signal in a frequency domain, and discriminating between bands respectively allocated to terminals in a frequency domain;

estimating a channel and computing a weight value from the signal transformed into the frequency domain and detecting an MMSE;

computing a time-domain bias from the weight value and a channel estimation value of the signal transformed to the frequency domain;

normalizing the detected MMSE by using the computed time-domain bias; and transforming the normalized signal into a normalized signal in a time domain, decoding the normalized signal transformed into the time domain, and transmitting the decoded normalized signal transformed into the time domain to each of the terminals.

2. The method of claim 1, wherein the time-domain bias satisfies an equation defined by:

$$c^{(u)}=1-\sigma_e(w)^2=E|w^{(u)}h^{(u)}|,$$

wherein $\sigma_e(w)^2$ represents a noise estimation value of the signal transformed to the frequency domain, $w^{(u)}$ represents the weigh value of the signal transformed to the frequency domain, and $h^{(u)}$ represents the channel estimation value of the signal transformed to the frequency domain.

3. The method of claim 1, wherein, the normalizing of the detected MMSE includes eliminating the time-domain bias by taking an inverse number of the time-domain bias for the MMSE detection value.

4. A method for receiving a Minimum Mean-Squared-Error (MMSE) in a Single-Carrier Frequency Division Multiple Access (SC-FDMA) system, the method comprising:

transforming a signal in a time domain received through an antenna into a signal in a frequency domain, and discriminating between bands respectively allocated to terminals in a frequency domain;

estimating a channel and computing a weight value from the signal transformed into the frequency domain, detecting an MMSE, and transforming the detected MMSE into an MMSE signal in a time domain;

computing a time-domain bias from the weight value and a channel estimation value of the signal transformed into the frequency domain;

normalizing the detected MMSE by using the computed time-domain bias; and decoding the normalized signal and transmitting the decoded normalized signal to each of the terminals.

5. The method of claim 4, wherein the time-domain bias satisfies an equation defined by:

$$c^{(u)}=1-\sigma_e(w)^2=E|w^{(u)}h^{(u)}|,$$

wherein $\sigma_e(w)^2$ represents a noise estimation value of the signal transformed to the frequency domain, $w^{(u)}$ represents the weigh value of the signal transformed to the frequency domain, and $h^{(u)}$ represents the channel estimation value of the signal transformed to the frequency domain.

6. The method of claim 4, wherein, the normalizing of the detected MMSE includes eliminating the time-domain bias by taking an inverse number of the time-domain bias for the MMSE detection value.

7. An apparatus for receiving a Minimum Mean-Squared-Error (MMSE) in a Single-Carrier Frequency Division Multiple Access (SC-FDMA) system, the apparatus comprising:

a first transformation unit for transforming a signal in a time domain received through an antenna into a signal in a frequency domain, and discriminating between bands respectively allocated to terminals in a frequency domain;

a channel estimator for estimating a channel from the signal transformed into the frequency domain;

a weight value computation unit for computing a weight value from the channel estimation value;

an MMSE detector for detecting an MMSE from the signal transformed into the frequency domain by using the computed weight value;

a second transformation unit for transforming the detected MMSE value into an MMSE signal in a time domain;

a bias computation unit for computing a time-domain bias from the weight value and the channel estimation value of the signal transformed into the frequency domain;

a normalizer for normalizing the MMSE signal transformed into the time domain by using the computed time-domain bias; and a decoder for decoding the normalized MMSE signal transformed into the time domain, and transmitting the decoded normalized MMSE signal to each of the terminals.

8. The apparatus of claim 7, wherein the time-domain bias satisfies an equation defined by:

$$c^{(u)} = 1 - \sigma_e(u)^2 = E|w^{(u)}h^{(u)}|,$$

wherein $\sigma_e(u)^2$ represents a noise estimation value of the signal transformed to the frequency domain, $w^{(u)}$ represents the weigh value of the signal transformed to the frequency domain, and $h^{(u)}$ represents the channel estimation value of the signal transformed to the frequency domain.

9. The apparatus of claim 7, wherein the normalizer eliminates the time-domain bias by taking an inverse number of the time-domain bias for the MMSE detection value.

10. An apparatus for receiving a Minimum Mean-Squared-Error (MMSE) in a Single-Carrier Frequency Division Multiple Access (SC-FDMA) system, the apparatus comprising:

a first transformation unit for transforming a signal in a time domain received through an antenna into a signal in a frequency domain, and discriminating between bands respectively allocated to terminals in a frequency domain;

a channel estimator for estimating a channel from the signal transformed into the frequency domain;

a weight value computation unit for computing a weight value from the channel estimation value;

an MMSE detector for detecting an MMSE from the signal transformed into the frequency domain by using the computed weight value;

a bias computation unit for computing a time-domain bias from the weight value and the channel estimation value;

a normalizer for normalizing the detected MMSE by using the computed time-domain bias;

a second transformation unit for transforming the normalized signal into a normalized signal in a time domain; and a decoder for decoding the normalized signal transformed into the time domain, and transmitting the decoded normalized signal to each of the terminals.

11. The apparatus of claim 10, wherein the time-domain bias satisfies an equation defined by:

$$c^{(u)} = 1 - \sigma_e(u)^2 = E|w^{(u)}h^{(u)}|,$$

wherein $\sigma_e(u)^2$ represents a noise estimation value of the signal transformed to the frequency domain, $w^{(u)}$ represents the weigh value of the signal transformed to the frequency domain, and $h^{(u)}$ represents the channel estimation value of the signal transformed to the frequency domain.

12. The apparatus of claim 10, wherein the normalizer eliminates the time-domain bias by taking an inverse number of the time-domain bias for the MMSE detection value.

* * * * *